INVENTORS
ALBERT B. SIMON
TERRENCE E. FOHS

June 13, 1967 A. B. SIMON ET AL 3,324,714
FLEXURE STIFFNESS TESTING MACHINE FOR ULTRA-THIN SHEETS
Filed March 10, 1965 4 Sheets-Sheet 3
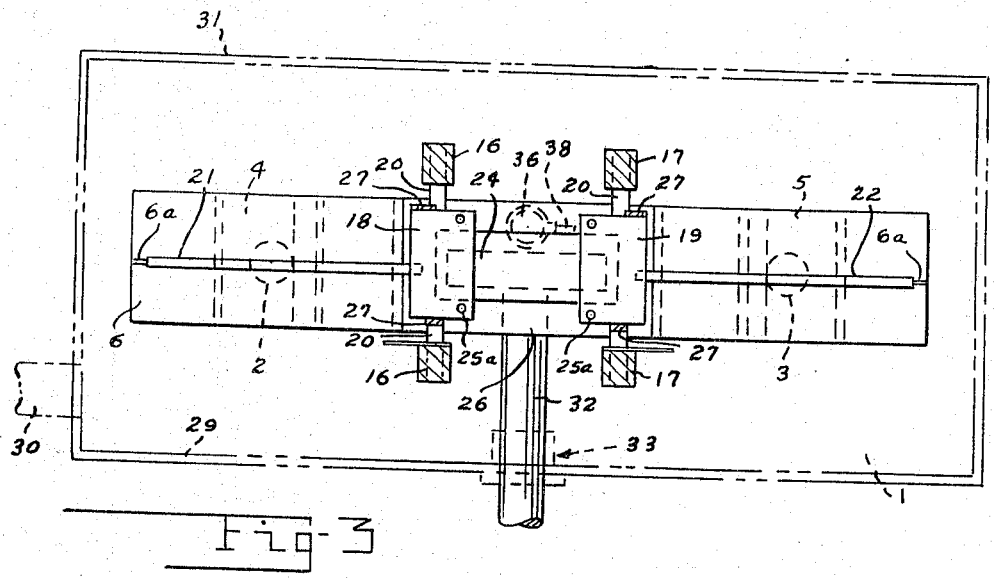
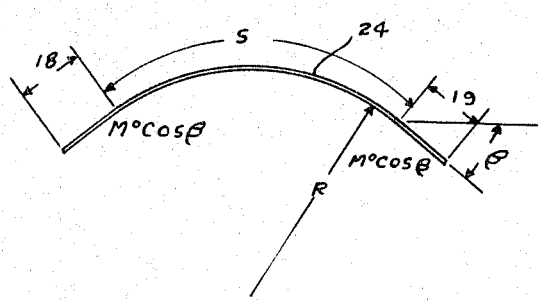
INVENTORS
ALBERT B. SIMON
TERRENCE E. FOHS
BY *Harry A. Herbert Jr.*
*Charles H. Wagner*
ATTORNEYS United States Patent Office 3,324,714
Patented June 13, 1967

3,324,714
FLEXURE STIFFNESS TESTING MACHINE FOR ULTRA-THIN SHEETS
Albert B. Simon and Terrence E. Fohs, Baltimore, Md., assignors, by mesne assignments, to the United States of America as represented by the Secretary of the Air Force
Filed Mar. 10, 1965, Ser. No. 438,801
11 Claims. (Cl. 73—100)

ABSTRACT OF THE DISCLOSURE

A bending strength tester having a flat specimen supported at each end by pivoted clamps. Each clamp has a weight arm, oriented so as to pivot the clamp and thus bend the specimen. The clamps are suspended for free movement along the axial length of the specimen, and a load is imposed on the specimen by lowering a poising device away from the weight arms. The bend is measured by pointers attached to each clamp and overlying scales on the support.

---

This invention relates to measuring and testing apparatus, and more particularly to the measuring and testing of the flexural characteristics of ultra-thin sheets, having for an object the provision of apparatus for measuring the flexural modulus of elasticity of very thin sheets (in the order of .001 inch).

A further object of the invention is the provision of means for measuring the flexural modulus of elasticity of very thin sample sheets of material in a predetermined atmospheric or other environment, such as in oxygen, or in a vacuum.

A further object is the provision of a testing device for applying and removing a bending load on a thin sheet sample or specimen for an unlimited number of times in a vacuum, or in a gaseous atmosphere by remote control, and providing successive flexure measurements during the successive flexures of the sheet sample, under the conditions.

A further object is the provision of an apparatus capable of applying and removing the bending load on a thin sheet sample for an unlimited number of times by remote control in a vacuum or gaseous medium, to measure rigidization rates of the sample in a vacuum, for a material which changes its flexural properties in a vacuum or gaseous medium.

A further object is the provision of a device for measuring the stiffness of thin sheet samples at a particular stress value, which provides a constant stress along the length of the specimen, particularly in plastics, where the modulus of elasticity is a function of the stress level.

A further object is the provision of an apparatus for applying an infinitely small bending moment, with the provision of applying a zero bending moment to determine the unstressed form of a specimen which tends to curl, or which has an initial curvature, whereby the deflection from this unstressed position can be subsequently measured when the load is applied and corrections made for the initial non-flatness.

A further object is the provision of a device where the mode of deflection is an arc of a circle and thus eliminates the approximations used for most other beam-deflection formulas.

A further object is the provision of a device in which both ends of a thin sample strip are clamped and freely suspended from above to eliminate extemporaneous longitudinal and lateral stresses on the sample during flexure thereof, together with means for subjecting the sample to a predetermined fluid or temperature and atmosphere, or in a vacuum, during bending or flexure of the sample.

Other objects and advantages of the invention will become apparent from the following description and accompanying drawings in which like reference characters refer to like parts in the several figures.

Drawings

FIGURES 3 is a detail sectional view taken about on line 3—3 in FIGURE 2, showing the case enclosure in phantom.

FIGURE 6 is a schematic view to illustrate the application of the solution formula for determining the flexural modulus of elasticity of a specimen.

Figure 1:
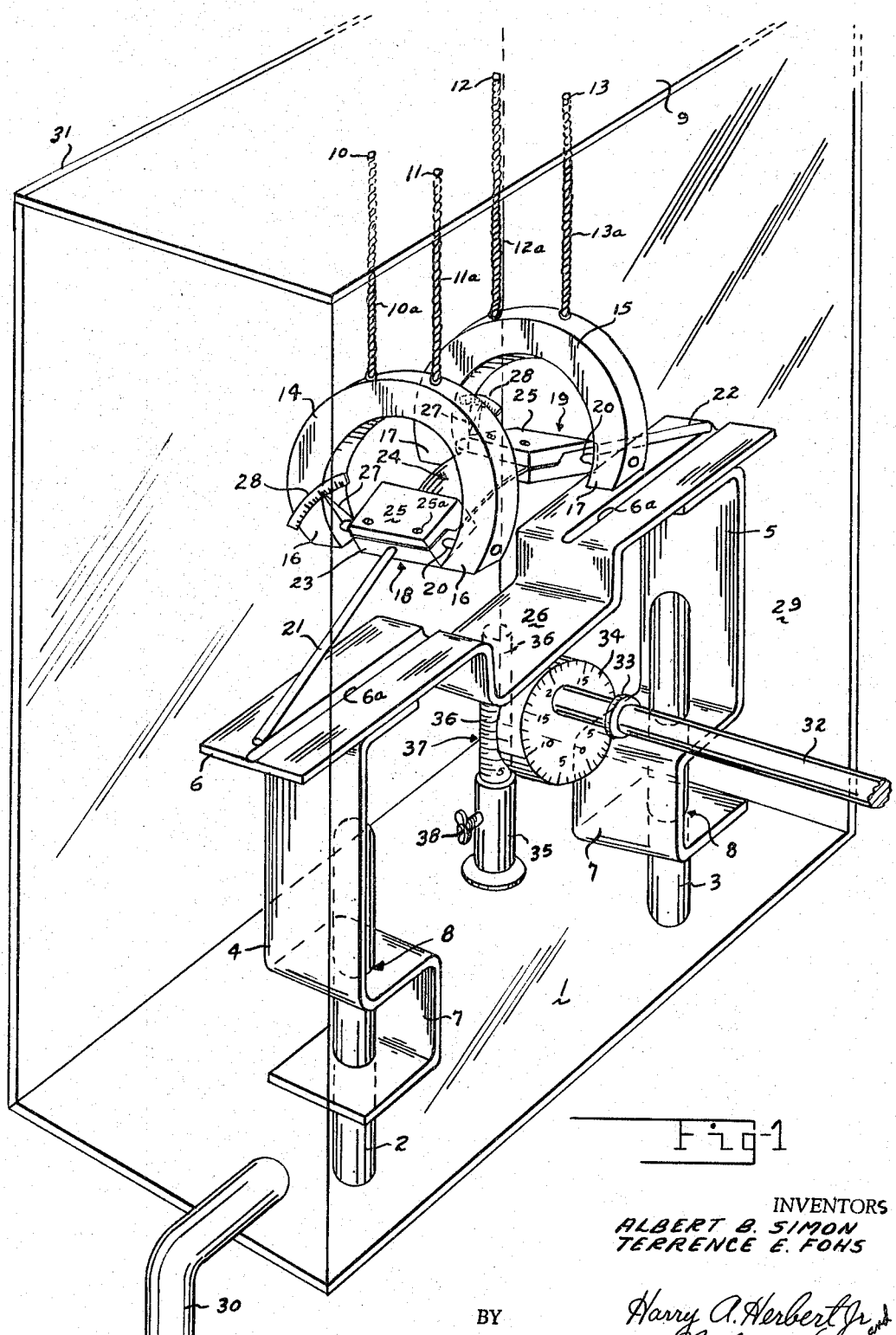
FIGURE 1 is a somewhat schematic perspective view of a testing device for thin sheet samples incorporating the invention, illustrating a thin sheet sample clamped in place at its ends and bent or flexed.

In the drawings, the reference numeral 1 denotes a horizontal support having a pair of spaced vertical guide means or posts 2 and 3 receiving downwardly depending guide plates 4 and 5 fixed to the lower surface of a vertically movable horizontal actuator plate 6.

The depending plates 4 and 5 are suitably bent, as indicated at 7, and apertured at 8 to provide smooth suitable bearing surfaces receiving the guide posts 2 and 3 to permit the actuator plate 6 to move smoothly up and down in a horizontally orientated position. Suspended above the actuator plate 6 by any suitable means, such as an upper rigid horizontal support 9, at spaced points 10 and 11, and 12 and 13 by spaced flexible suspension supports or cables 10$^a$, 11$^a$ and 12$^a$, 13$^a$ are two substantially U or C shape inverted rigid, preferably metallic supporting frame members 14 and 15 having spaced depending arms 16 and 17.

The suspension of the C or U shape members 14 and 15 on or by the cables 10$^a$ to 13$^a$ is such that they gravitate to spaced parallel positions as shown, in planes perpendicular to plane or upper surface of the actuator plate 6, and are free to swing laterally and longitudinally and twist relative to the upper longitudinal surface of the plate 6.

Figure 5:
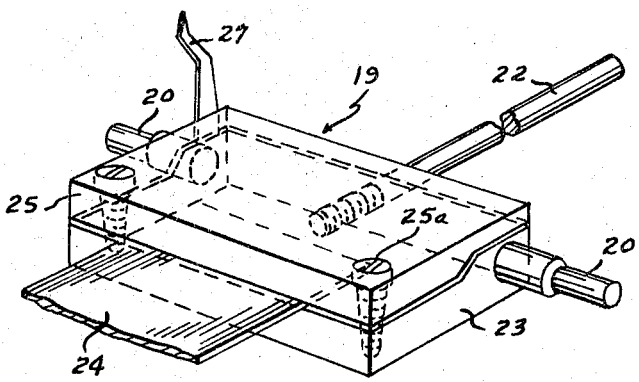
FIGURE 5 is a detail perspective view of one of the pivoted clamps for the samples or specimens.

Freely journalled on suitable anti-friction bearings between and in the extremities of the spaced arms 16—16 and 17—17 of the frames 14 and 15 are specimen-clamping plates 18 and 19, respectively, somewhat after the structure shown in FIGURE 5, the bearings being indicated at 20.

Extending outwardly in opposite directions from the remote sides of the blocks 18 and 19 are elongated pointers or block tilting weight rods or arms 21 and 22.

The specimen clamping blocks 18 and 19, as seen in FIGURE 5 more particularly, each comprise a lower block member 23 which carries one of the pointer rods 21 or 22 and the anti-friction bearing members 20.

In the drawings, the thin sheet-like specimen is indicated at 24 with the ends overlying the lower block members 23 and upper clamping plates 25 are disposed in superimposed relation, and drawn down to clamp the end portions of the elongated specimen sheet 24 therebetween. The plates 25 may be hinged at their edges near the rods 21 or 22 to the lower pivoted blocks 23, also any suitable clamping means may be provided to properly secure the opposite ends of the specimen 24 between the parallel faces of the blocks. As shown, a pair of clamp screws 25ª are provided for this purpose.

As illustrated, the arrangement is such that the specimen may be bent or bowed between the clamps 18–19 from or between a position in which the specimen 24 lies in the flat plane with the pointers 21–22 extending horizontally along the top surfaces of the actuator plate 6 in the diametrically opposite directions (in horizontal alignment and in a bowed position). To accommodate the pointers while in the horizontal position, the upper surface of the plate 6 is provided with grooves or channels 6ª.

The actuator plate 6 is also formed with a depressed or downwardly bent intermediate portion 26 having a suitable width between the side walls to accommodate the suspended clamping blocks 18 and 19 and prevent any direct contact between the blocks 18–19 and the actuator plate 6, thus permitting the blocks to be freely suspended by the supporting cables 10ª to 13ª so that the clamps 18 and 19 are free for adjustment relative to each other, longitudinally, laterally and rotatively relatively during the bending.

The channels or grooves 6ª—6ª in the actuator plate 6 aligns up the clamping plates while the specimen plate is being placed in position in the clamps and during the securing of the specimen in place in a horizontal position.

The pointers 21 and 22 have some predetermined weight for the purpose of tilting the clamping block as the actuating plate 6 moves or gravitates downwardly away from the sample specimen 24 to cause the sample to bow or bend.

It is, of course, understood that when the pointers 21–22 leave the surface of the plate 6, the substantially free floating U-shape supports 14 and 15 are free to twist, and move laterally and longitudinally with respect to each other, thus permitting the sample specimen to bend naturally without undue restriction. It is thus possible to measure the flexural modulus of elasticity of very thin sheets (in order of .001 inch) such as certain plastics. Some plastics and fabrics tend to curl, creating further difficulties, however, the device of the subject invention provides accurate measurements of the flexural modulus under any and all of the above conditions. Due to the free pivotal and floating action of the blocks 18 and 19, the samples or specimens 24 will assume a free and natural bow or arc as shown in FIGURE 1, and in dotted lines, in FIGURE 2 when the actuating plate 6 is lowered, a suitable indicator means is preferably provided to indicate the deflection of the specimens 24. One device for procuring accurate measurements of the flexural modulus is to place a scale behind the pointers to indicate the angular deflections. However, as shown in the drawings in FIGURE 2, the tiltable clamping blocks 23 may be each provided with a fixed pointer 27 which registers with a suitable arcuate indicia scale 28 calibrated to indicate the angular deflection of the clamped ends of the specimen from the horizontal.

As before mentioned, certain sheet materials have different flexural stiffness in different surrounding environments, for instance, in a vacuum, and in certain fluid surrounding atmosphere, such as oxygen-rich conditions, and in different temperature conditions.

For this purpose, the device is preferably surrounded by a sealed case or casing 29 having a pipe 30, and closed by the upper and lower support panels 9 and 1. One of the sides, for instance, the rear closure 31 may provide a suitable access door.

Any suitable means may be provided for moving the actuator plate 6 up and down vertically on the guide rods 2 and 3. As shown, however, a shaft 32, preferably power driven, extends through a seal bearing or bushing 33 into the case 29 at a suitable distance below the actuator plate 6, preferably under the portion 26, and carries an actuating cam 34 of a predetermined contour. Rotation of the actuating cam means 34 moves the actuator plate 6 down from and up to the zero position, as shown in full and dotted lines in FIGURE 2. Other actuating means may be provided, for instance, a hydraulic system.

The degree of bending of the sample 24 from the horizontal may be controlled by the weight of the pointer rods, the size and shape of the cam 34, or stop means limiting actuator plate movement. Different contour cams may be provided for effecting the desired flexure of the samples.

Figure 2:
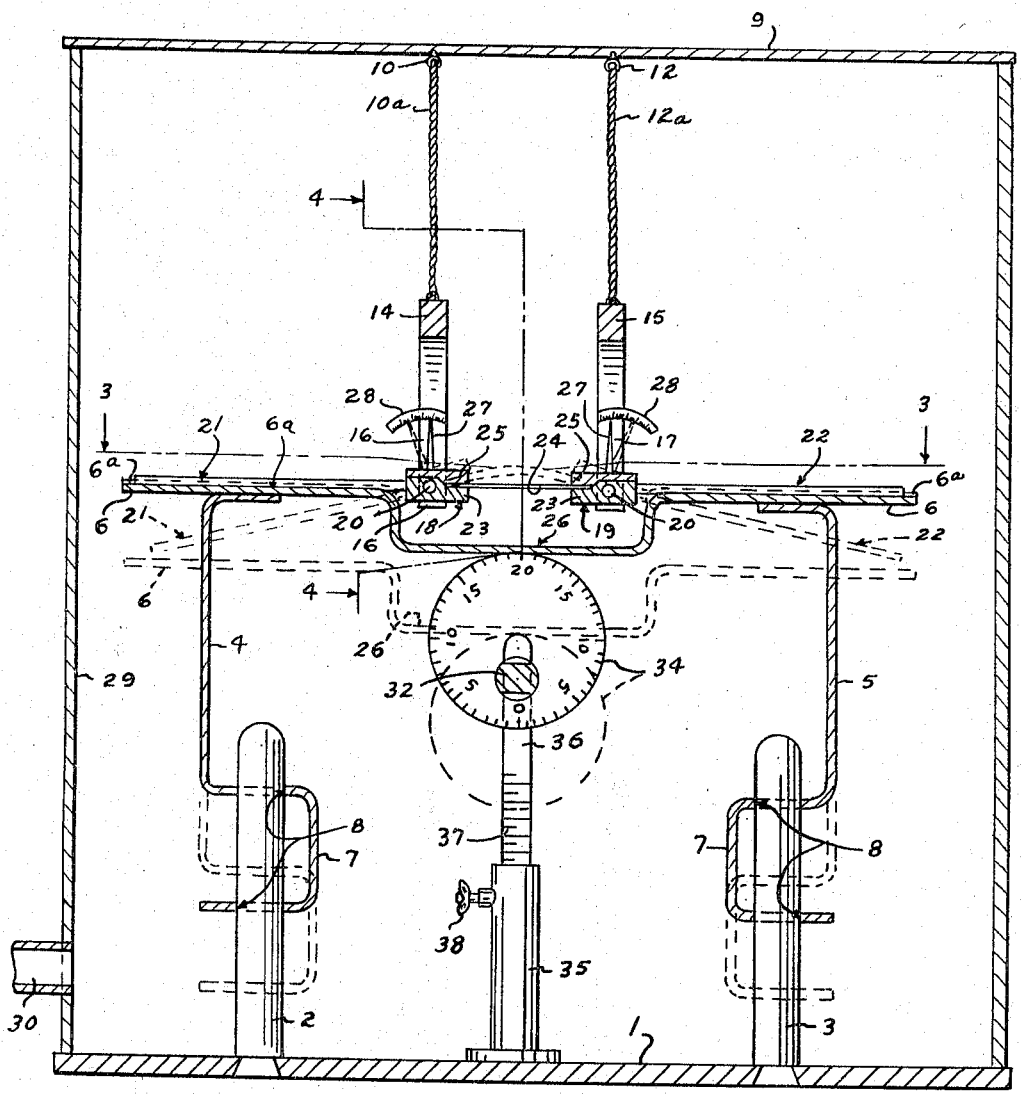
FIGURE 2 is a longitudinal vertical section through the device, substantially as shown in FIGURE 1 but with the sample unbent in full lines.
Figure 4:
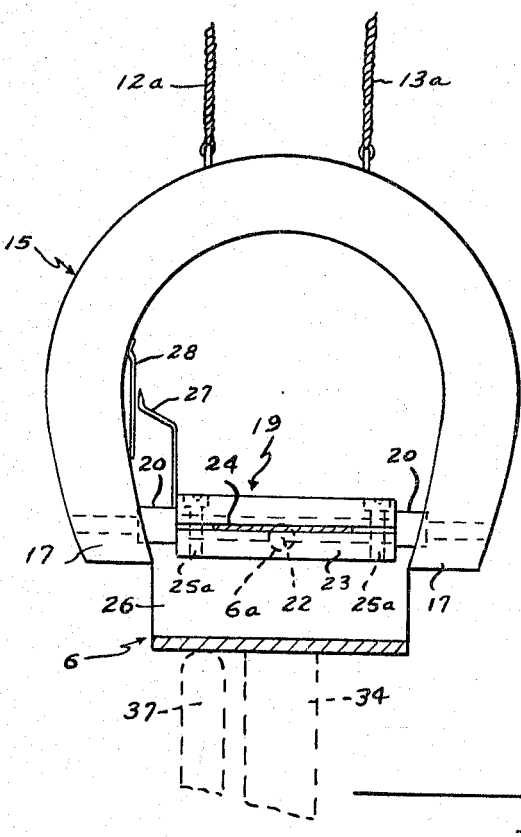
FIGURE 4 is an enlarged detail sectional view, taken about on line 4—4 in FIGURE 2.

Means may also be provided for limiting the degree of flexure, and indicating the degree of flexure. For instance, as shown in FIGURE 2, in which a guide sleeve 35 projects upwardly from the supporting base plate 1, directly below the central portion 26 of the acuator plate 6 and telescopically receives a stop or movement limiting rod 36 calibrated at 37 to indicate the maximum allowed deflections of the sample 24. The rod 36 may be adjustable vertically to dispose the upper or abutment end at the desired distance below the actuator plate 6 when the plate is in its upper position as shown in FIGURE 2, and a suitable thumbscrew 38 may be provided in the upper end of the sleeve 35 for securing the rod 36 against accidental vertical movement.

The equation for determining the flexural modulus of elasticity of the device as used for measuring stiffness and rates of rigidization in a vacuum for thin (.001) sheets of polyvinyl alcohol, Mylar and some fabrics and laminates is illustrated in FIGURE 6 by employing the following formula.

The moment applied by the weighted pointer is $$M_0 \cos \beta$$

in which:
$M_0$=moment about pivot when pointer is horizontal
$\beta$=angular deflection of end of specimen
$S$=span of specimen
$R$=radius of curvature of specimen
$E$=flexural modulus of elasticity
$I$=area moment of inertia of specimen's cross section about the neutral axis.

The curvature is given by (neglecting the weight of the specimen).

$$\frac{1}{R} = \frac{M_0 \cos \beta}{EI}$$

Substituting:

$$R = \frac{S}{2\beta}$$

and $$I = \frac{wd^3}{12}$$

where $w$=width of specimen
$d$=thickness of specimen gives $$E = \frac{6M_0 S \cos \beta}{wd^3 \beta}$$

If there is any initial curvature of the specimen, the equation becomes:

$$E = \frac{6M_0 S \cos \beta_1}{wd^3(\beta_1 - \beta_0)}$$

where $\beta_0$=initial deflection
$\beta_1$=final deflection

If the supporting cords or cables 10ª to 13ª are not parallel at the equilibrium position (they can easily be adjusted so, unless the specimen is unaccessible, e.g., as in a vacuum) and/or if pivot friction can not be eliminated through vibration, the modulus must be computed by the following equation:

$$M_0 \cos \beta \Delta\beta = W\Delta H + \frac{Ewd^3\beta}{6S} \cdot \Delta\beta + M_{fr}\Delta\beta$$

where $W$ = weight of bearing ring and clamping block
$\Delta H$ = the change in height of $W$ (it is a function of $\beta$ which function depends on the geometry of the suspension)
$M_{fr}$ = the pivot function It is, of course, understood that the temperature within the casing 29 may be raised, lowered and regulated by any suitable means not shown.

For purposes of exemplification, a particular embodiment of the invention has been shown and described to the best understanding thereof. However, it will become apparent that changes and modifications in the arrangement and construction of the parts thereof may be resorted to without departing from the true spirit and scope of the invention as defined in the following claims.

We claim:

1. A flexure-stiffness testing machine for ultra-thin elongated sample specimen sheets comprising, a support, vertical guide means fixed on said support, an elongated horizontal actuator plate carried by said guide means for vertical up and down parallel movements, a pair of horizontally spaced specimen clamping plates tiltably supported above said actuator plate, having tilt axes disposed for transverse and angular adjustments in a horizontal plane including fully flexible supporting means carried by said support and depending downwardly from said support above said blocks for normally supporting said blocks in predetermined spaced relation to each other above said actuator plate with the tilt axes thereof disposed in spaced parallel vertical planes normal to the longitudinal axis of said actuator plate, said blocks including clamping means for clamping the opposite end portions of an ultra-thin elongated sheet specimen in the blocks to provide a predetermined bendable portion thereof between the adjacent spaced sides of the blocks, weighted block tilting arms projecting outwardly from the blocks in directions away from the specimen, located in planes through the tilt axes of the block and the clamped ends of the specimen, said weight tilting arms having end portions disposed in the path of vertical movement of said actuator plate for lifting impingement by said plate during upward movement of the plate to tilt each of said blocks in one direction, and lower the ends of said weight tilting arms during downward movement of said actuator plate, means for raising and lowering said actuator plate into and out of engagement with said weight tilting arms, and means for determining the angular relation between the clamped ends of the specimen and the horizontal during tilting adjustments of said blocks by said plate.

2. A flexure-stiffness testing machine for ultra-thin elongated sheet specimens comprising, a support, vertical guide means fixed to and extending upwardly on said support, an elongated horizontal actuator plate carried by said guide means for vertical up and down parallel oriented movements, a pair of horizontally spaced ultra-thin sheet specimen clamping blocks tiltably supported above said actuator plate having horizontally spaced tilt axes disposed in a horizontal plane in spaced parallel vertical planes extending through said actuator plate normal to the longitudinal axis of the plate at opposite sides of the center thereof, horizontally spaced fully flexible gravitational vertical supporting means depending downwardly from said support in vertical planes through said block tilt axes for tiltably supporting said clamping blocks in a predetermined horizontal plane above said actuator plate for gravitational adjustments in transverse-horizontal directions above said actuator plate, said blocks including specimen clamping means for clamping the opposite end portions of the specimens in said blocks with a predetermined bendable specimen portion therebetween, a weighted pointer arm projecting outwardly from each of said blocks substantially normal to the tilt axes of the blocks in opposite directions away from the clamped specimen in planes extending through the clamped end portions of the specimen in the block, angle measuring means between the tiltable blocks and the block supporting means for indicating the angular relation between the clamped end portions of the specimen and the horizontal, said actuator plate being movable upwardly into lifting engagement with said pointer arms and downwardly to lower said arms to permit the weight of said arms to tilt said blocks in opposite directions, and means for raising and lowering said actuator plate into and out of actuating engagement with said pointer arms for straightening and bending a specimen sheet between said tiltable clamping blocks.

3. Apparatus as claimed in claim 2, including means between said support and said actuator plate for limiting downward movement of said plate to limit the degree of tilt of said clamping blocks and the degree of flexure of said specimen sample between said blocks.

4. A flexure-stiffness testing machine for ultra-thin sheets comprising, supporting means having a lower horizontal support and an upper vertically spaced support, vertical guide means projecting upwardly from said lower support, an elongated horizontal actuator plate guidably mounted on said guide means for up and down parallel horizontally oriented movements, a pair of horizontally spaced tiltable, ultra-thin sheet specimen supporting and clamping blocks tiltably disposed on horizontally spaced tilt axes in a predetermined horizontal plane above said actuator plate in horizontally spaced vertical planes through said actuator plate normal to the longitudinal axis of said plate at opposite sides of the center of said plate, horizontally spaced pairs of flexible suspension cable means depending downwardly from said upper support in spaced substantially parallel vertical planes through the tilt axes of said blocks and connected thereto at the tilt axis thereof for tiltably supporting the blocks above said actuator plate, said blocks including clamping means for securing the opposite ends of an ultra-thin sheet specimen in said blocks in a horizontal position with a major portion of the sheet specimen unsupported between the blocks to provide a materially elongated bending zone for the specimen between the blocks, weight tilting arms projecting from the blocks in opposite directions away from the specimen for tilting the blocks around the tilt axes thereof in opposite directions to bow the specimen between the blocks, said weight arms extending in planes parallel to the clamped ends of the specimen, means for moving said actuator plate upwardly for lifting engagement with the outer end portions of the arms for tilting said blocks in one direction to dispose the clamped ends of the specimen in a horizontal plane, and for lowering of said plate to lower the outer ends of said arms to tilt said clamping blocks in said opposite directions to bow said specimen between said blocks, and means for determining the degree of tilting movement of said blocks to measure the angle between the clamped ends of the specimen and the horizontal during the tilting of said blocks by said weight rods, during downward movement of said actuator plate.

5. A flexure-stiffness testing apparatus for testing ultra-thin sheet material specimen comprising, supporting means having a lower support and a vertically spaced upper support, guide means projecting vertically upward from said lower support, an elongated horizontally extending actuator plate mounted on said guide means for vertical up and down movements in parallel horizontally oriented relation, a pair of horizontally spaced tiltable ultra-thin sheet specimen clamping blocks tiltably disposed on horizontally spaced tilt axes in a predetermined horizontal plane above said actuator plate in vertical planes through said actuator plate normal to the longitudinal axis of said plate at opposite sides of the center of said plate, horizontally spaced pairs of freely flexible suspension cable means depending downwardly from said upper support in spaced substantially parallel vertical planes through the tilt axes of said blocks and connected thereto at the tilt axes thereof for tiltably supporting said clamping blocks above said actuator plate, said blocks including clamping means for securing the opposite ends of an ultra-thin elongated sheet specimen in said blocks in a horizontal position in a plane extending through the tilt axes of the blocks, with a major portion of the sheet specimen unsupported between the blocks to provide a materially elongated bending zone for the specimen between the blocks, weight-tilting arms projecting from the blocks in opposite directions away from the specimen for gravitational tilting of said blocks around said tilt axes thereof in opposite directions to bow said specimen upwardly between said blocks, said weight-arms extending in planes coincident with said clamped end portions of said specimen, means for moving said actuator plate upwardly for lifting engagement with the outer end portions of said arms when said blocks are tilted and the specimen is bowed, to dispose the clamped ends of the specimen in a horizontal plane, and for lowering said actuator plate to lower the outer ends of said arms to tilt said clamping blocks in opposite directions to bow said specimen upwardly between said blocks, and means between said suspension means and said blocks for indicating the degree of tilting movement of said blocks to measure the angle between the planes of the clamped ends of said specimen and the horizontal during the tilting of said blocks by the weight of said weight-rods during downward movement of said actuator plate.

6. A flexure-stiffness testing apparatus as set forth in claim 5 including an accessible sealed casing surrounding said testing apparatus having an upper closure constituting said upper support and a lower closure constituting said lower support, and conduit means in communication with the interior of said casing for withdrawing air from within the casing to create a vacuum therein, or introducing a "foreign" atmosphere therein such as a predetermined gaseous medium, during testing of said specimen.

7. Apparatus as set forth in claim 5 including, adjustable means carried by said lower support for limiting the downward movement of said actuator plate on said guide means to limit the bending of said sheet specimen by said weight pointer arms.

8. Apparatus as set forth in claim 6 including adjustable means carried by said support for limiting the downward movement of said actuator plate for limiting the downward movement of the outer ends of said weight pointer arms to limit the tilting of said blocks and degree of bowing of the specimen.

9. A testing device as set forth in claim 8 in which the suspension means for the specimen clamping blocks comprises a spaced pair of inverted substantially U-shaped rigid frames, having said clamping blocks pivoted thereto on the aforesaid tilt axes, and includes spaced pairs of flexible parallel suspension cables connected at their lower ends to the upper portions of the frames in the planes of the frames and connected at their upper ends to spaced points on the upper support disposed in vertical planes extending through the tilt axes of said blocks.

10. In a flexure stiffness testing device, a closed casing having a transparent viewing panel, an upper horizontal support, and a lower supporting horizontal base, two spaced pairs of flexible supporting cables depending downwardly from said upper support in spaced vertical planes, in equally spaced vertical planes normal to the aforesaid veritcal planes, an inverted substantially U-shaped rigid weighted frame suspended from the lower ends of each pair of said supporting cables to dispose said frames in predetermined spaced parallel vertical planes, a pair of sample specimen clamping blocks tiltably journalled in said frames in horizontally spaced relation to each other on tilt axes in said frames disposed in parallel relation in a horizontal plane for receiving and clamping the opposite ends of an elongated sheet specimen therein, elongated weight rods projecting from said clamping blocks in opposite directions away from said specimen sample in the planes of the clamped ends of said specimen sample, in a vertical plane perpendicular to the tilt axes of the blocks, an elongated horizontally oriented vertically movable actuator plate disposed below said clamping blocks and said weight-rods, movable upwardly in horizontally oriented relation for lifting engagement with the ends of said rods for moving the rods into horizontal aligned positions to dispose the clamped ends of the specimen in a horizontal plane, and movable downwardly to lower the outer ends of said rods for tilting said blocks to bow the specimen sample upwardly between the blocks, and means between the frames and the blocks for indicating the degree of tilt between the blocks and the supporting frames incident to downward movement of said actuator plate.

11. Apparatus as claimed in claim 10, in which said actuator plate is formed with aligned longitudinal grooves in the upper surface thereof for receiving the weight rods therein upon movement of the plate to move said rods to horizontal positions to retain said suspended frames in said parallel vertical planes in stabilized condition with the ends of the specimen in horizontal planes, said actuating plate having a downwardly depressed intermediate portion for receiving the lower ends of the suspended frames and said clamps in spaced relation upon elevation of said actuator plate to move said rods to horizontal position, and means for moving said actuating plate up and down between predetermined horizontally oriented positions.

References Cited

UNITED STATES PATENTS 1,443,877　1/1923　Guelbaum _____ 73—100

FOREIGN PATENTS 771,010　3/1957　Great Britain.
101,435　8/1922　Switzerland.

RICHARD C. QUEISSER, *Primary Examiner.*

J. H. WILLIAMSON, *Assistant Examiner.*